(12) United States Patent
DiCaprio et al.

(10) Patent No.: US 10,379,255 B2
(45) Date of Patent: Aug. 13, 2019

(54) INVERTING GEOPHYSICAL DATA FOR GEOLOGICAL PARAMETERS OR LITHOLOGY

(75) Inventors: Christopher J. DiCaprio, Houston, TX (US); Rebecca L. Saltzer, Houston, TX (US); Anoop A. Mullur, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 1453 days.

(21) Appl. No.: 13/701,431

(22) PCT Filed: Jun. 17, 2011

(86) PCT No.: PCT/US2011/040929
§ 371 (c)(1),
(2), (4) Date: Nov. 30, 2012

(87) PCT Pub. No.: WO2012/015542
PCT Pub. Date: Feb. 2, 2012

(65) Prior Publication Data
US 2013/0116927 A1    May 9, 2013

Related U.S. Application Data

(60) Provisional application No. 61/368,035, filed on Jul. 27, 2010.

(51) Int. Cl.
*G01V 11/00* (2006.01)

(52) U.S. Cl.
CPC .......... *G01V 11/00* (2013.01); *G01V 2210/62* (2013.01)

(58) Field of Classification Search
CPC ..... G01V 1/306; G01V 2210/62; G01V 11/00
USPC .............................................. 702/9
See application file for complete search history.

(56) References Cited

U.S. PATENT DOCUMENTS

| | | | |
|---|---|---|---|
| 4,742,305 A | 5/1988 | Stolarczyk | |
| 4,792,761 A | 12/1988 | King et al. | |
| 4,831,383 A | 5/1989 | Ohnishi et al. | |
| 4,875,015 A | 10/1989 | Ward | |

(Continued)

FOREIGN PATENT DOCUMENTS

| | | |
|---|---|---|
| EP | 2 020 609 | 2/2009 |
| GB | 2 402 745 | 8/2005 |

(Continued)

OTHER PUBLICATIONS

Bosch, M. et al. (2002), "Lithology discrimination from physical rock properties," *Geophysics* 67(2), pp. 573-581.

(Continued)

*Primary Examiner* — Janet L Suglo
(74) *Attorney, Agent, or Firm* — ExxonMobil Upstream Research Company—Law Department

(57) ABSTRACT

Method for estimating porosity and water saturation or other geological parameters of a subsurface region when the lithology of the region is unknown, requiring only geophysical data from remote surveys. The geophysical data are inverted (14-18) treating lithology as a third, and discrete, unknown model parameter (12) to be solved for in the inversion. A technique for solving mixed integer non-linear programs may be used. Suitable rock physics relationships (13) are used to relate the desired geological parameters to the geophysical model parameters required for simulating the geophysical data in the inversion process.

14 Claims, 1 Drawing Sheet

(56) References Cited

U.S. PATENT DOCUMENTS

| | | |
|---|---|---|
| 4,964,096 A | 10/1990 | Ruckgaber |
| 5,050,129 A | 9/1991 | Schultz |
| 5,175,500 A | 12/1992 | McNeill |
| 5,189,644 A | 2/1993 | Wood |
| 5,210,691 A | 5/1993 | Freedman et al. |
| 5,265,192 A | 11/1993 | McCormack |
| 5,357,893 A | 10/1994 | Ruffa |
| 5,373,443 A | 12/1994 | Lee et al. |
| 5,406,206 A | 4/1995 | Safinya et al. |
| 5,467,018 A | 11/1995 | Ruter et al. |
| 5,475,589 A | 12/1995 | Artimage |
| 5,563,513 A | 10/1996 | Tasci et al. |
| 5,583,825 A | 12/1996 | Carrazzone et al. |
| 5,594,343 A | 1/1997 | Clark et al. |
| 5,706,194 A | 1/1998 | Neff et al. |
| 5,764,515 A | 6/1998 | Guerillot et al. |
| 5,770,945 A | 6/1998 | Constable |
| 5,825,188 A | 10/1998 | Montgomery et al. |
| 5,835,883 A | 11/1998 | Neff et al. |
| 5,838,634 A | 11/1998 | Jones et al. |
| 5,841,733 A | 11/1998 | Bouyoucos et al. |
| 5,884,227 A | 3/1999 | Rabinovich et al. |
| 5,905,657 A | 5/1999 | Celniker |
| 6,037,776 A | 3/2000 | McGlone |
| 6,049,760 A | 4/2000 | Scott |
| 6,088,656 A | 7/2000 | Ramakrishnan et al. |
| 6,094,400 A | 7/2000 | Ikelle |
| 6,101,448 A | 8/2000 | Ikelle et al. |
| 6,115,670 A | 9/2000 | Druskin et al. |
| 6,138,075 A | 10/2000 | Yost |
| 6,181,138 B1 | 1/2001 | Hagiwara et al. |
| 6,253,100 B1 | 6/2001 | Zhdanov |
| 6,253,627 B1 | 7/2001 | Lee et al. |
| 6,256,587 B1 | 7/2001 | Jericevic et al. |
| 6,278,948 B1 | 8/2001 | Jorgensen et al. |
| 6,304,086 B1 | 10/2001 | Minerbo et al. |
| 6,311,132 B1 | 10/2001 | Rosenquist et al. |
| 6,332,109 B1 | 12/2001 | Sheard et al. |
| 6,339,333 B1 | 1/2002 | Kuo |
| 6,393,363 B1 | 5/2002 | Wilt et al. |
| 6,424,918 B1 | 7/2002 | Jorgensen et al. |
| 6,430,507 B1 | 8/2002 | Jorgensen et al. |
| 6,466,021 B1 | 10/2002 | MacEnany |
| 6,470,274 B1 | 10/2002 | Mollison et al. |
| 6,476,609 B1 | 11/2002 | Bittar |
| 6,480,790 B1 | 11/2002 | Calvert et al. |
| 6,493,632 B1 | 12/2002 | Mollison et al. |
| 6,502,037 B1 | 12/2002 | Jorgensen et al. |
| 6,529,833 B2 | 3/2003 | Fanini et al. |
| 6,533,627 B1 | 3/2003 | Ambs |
| 6,534,986 B2 | 3/2003 | Nichols |
| 6,593,746 B2 | 7/2003 | Stolarczyk |
| 6,594,584 B1 | 7/2003 | Omeragic et al. |
| 6,671,623 B1 | 12/2003 | Li |
| 6,675,097 B2 | 1/2004 | Routh et al. |
| 6,686,736 B2 | 2/2004 | Schoen et al. |
| 6,711,502 B2 | 3/2004 | Mollison et al. |
| 6,724,192 B1 | 4/2004 | McGlone |
| 6,739,165 B1 | 5/2004 | Strack |
| 6,765,383 B1 | 7/2004 | Barringer |
| 6,813,566 B2 | 11/2004 | Hartley |
| 6,816,787 B2 | 11/2004 | Ramamoorthy et al. |
| 6,842,006 B2 | 1/2005 | Conti et al. |
| 6,842,400 B2 | 1/2005 | Blanch et al. |
| 6,846,133 B2 | 1/2005 | Martin et al. |
| 6,876,725 B2 | 4/2005 | Rashid-Farrokhi et al. |
| 6,883,452 B1 | 4/2005 | Gieseke |
| 6,888,623 B2 | 5/2005 | Clements |
| 6,901,029 B2 | 5/2005 | Raillon et al. |
| 6,901,333 B2 | 5/2005 | Van Riel et al. |
| 6,914,433 B2 | 7/2005 | Wright et al. |
| 6,950,747 B2 | 9/2005 | Byerly |
| 6,957,708 B2 | 10/2005 | Chemali et al. |
| 6,958,610 B2 | 10/2005 | Gianzero |
| 6,977,866 B2 | 12/2005 | Huffman et al. |
| 6,985,403 B2 | 1/2006 | Nicholson |
| 6,993,433 B2 | 1/2006 | Chavarria et al. |
| 6,999,880 B2 | 2/2006 | Lee |
| 7,002,349 B2 | 2/2006 | Barringer |
| 7,002,350 B1 | 2/2006 | Barringer |
| 7,023,213 B2 | 4/2006 | Nichols |
| 7,035,525 B2 | 4/2006 | Weeks et al. |
| 7,062,072 B2 | 6/2006 | Anxionnaz et al. |
| 7,092,315 B2 | 8/2006 | Olivier |
| 7,109,717 B2 | 9/2006 | Constable |
| 7,113,869 B2 | 9/2006 | Xue |
| 7,114,565 B2 | 10/2006 | Estes et al. |
| 7,116,108 B2 | 10/2006 | Constable |
| 7,126,338 B2 | 10/2006 | MacGregor et al. |
| 7,142,986 B2 | 11/2006 | Moran |
| 7,187,569 B2 | 3/2007 | Sinha et al. |
| 7,191,063 B2 | 3/2007 | Tompkins |
| 7,203,599 B1 | 4/2007 | Strack et al. |
| 7,227,363 B2 | 6/2007 | Gianzero et al. |
| 7,250,768 B2 | 7/2007 | Ritter et al. |
| 7,257,049 B1 | 8/2007 | Laws et al. |
| 7,262,399 B2 | 8/2007 | Hayashi et al. |
| 7,262,602 B2 | 8/2007 | Meyer |
| 7,307,424 B2 | 12/2007 | MacGregor et al. |
| 7,328,107 B2 | 2/2008 | Strack et al. |
| 7,337,064 B2 | 2/2008 | MacGregor et al. |
| 7,347,271 B2 | 3/2008 | Ohmer et al. |
| 7,356,412 B2 | 4/2008 | Tompkins |
| 7,362,102 B2 | 4/2008 | Andreis |
| 7,382,135 B2 | 6/2008 | Li et al. |
| 7,400,977 B2 | 7/2008 | Alumbaugh et al. |
| 7,411,399 B2 | 8/2008 | Reddig et al. |
| 7,424,367 B2 | 9/2008 | Saltzer et al. |
| 7,453,763 B2 | 11/2008 | Johnstad |
| 7,456,632 B2 | 11/2008 | Johnstad et al. |
| 7,477,160 B2 | 1/2009 | Lemenager et al. |
| 7,482,813 B2 | 1/2009 | Constable et al. |
| 7,502,690 B2 | 3/2009 | Thomsen et al. |
| 7,504,829 B2 | 3/2009 | Watts |
| 7,536,262 B2 | 5/2009 | Hornbostel et al. |
| 7,542,851 B2 | 6/2009 | Tompkins |
| 7,636,275 B2 | 12/2009 | Anno et al. |
| 7,659,721 B2 | 2/2010 | MacGregor et al. |
| 7,660,188 B2 | 2/2010 | Meldahl |
| 7,683,625 B2 | 3/2010 | Milne et al. |
| 7,822,552 B2 | 10/2010 | Bittleston |
| 7,840,394 B2 | 11/2010 | Madatov et al. |
| 7,884,612 B2 | 2/2011 | Conti et al. |
| 7,928,732 B2 | 4/2011 | Nichols |
| 8,008,920 B2 | 8/2011 | Lu et al. |
| 8,098,543 B2 | 1/2012 | Bachrach et al. |
| 8,099,239 B2 | 1/2012 | MacGregor et al. |
| 2002/0172329 A1 | 11/2002 | Rashid-Farrokhi et al. |
| 2005/0128874 A1 | 6/2005 | Herkenhoff et al. |
| 2005/0237063 A1 | 10/2005 | Wight et al. |
| 2006/0015260 A1 | 1/2006 | Masson et al. |
| 2006/0186887 A1 | 8/2006 | Strack et al. |
| 2007/0280047 A1 | 12/2007 | MacGregor et al. |
| 2007/0288211 A1 | 12/2007 | MacGregor et al. |
| 2008/0007265 A1 | 1/2008 | Milne et al. |
| 2008/0008920 A1 | 1/2008 | Alexandrovichserov et al. |
| 2008/0015782 A1 | 1/2008 | Saltzer et al. |
| 2008/0105425 A1 | 5/2008 | MacGregor et al. |
| 2008/0106265 A1 | 5/2008 | Campbell |
| 2009/0005997 A1 | 1/2009 | Willen |
| 2009/0187391 A1 | 7/2009 | Wendt et al. |
| 2009/0204330 A1 | 8/2009 | Thomsen et al. |
| 2009/0243613 A1 | 10/2009 | Lu et al. |
| 2009/0303834 A1 | 12/2009 | Sengupta et al. |
| 2009/0306900 A1 | 12/2009 | Jing et al. |
| 2009/0309599 A1 | 12/2009 | Ziolkowski |
| 2010/0074053 A1 | 3/2010 | Jaiswal et al. |
| 2010/0179761 A1 | 7/2010 | Burtz et al. |

FOREIGN PATENT DOCUMENTS

| | | |
|---|---|---|
| GB | 2 410 635 | 12/2006 |
| WO | WO 1998/07050 | 2/1998 |
| WO | WO 2004/109338 | 12/2004 |

(56) References Cited

FOREIGN PATENT DOCUMENTS

| WO | WO 2006/052145 | 5/2006 |
|---|---|---|
| WO | WO 2006/073315 | 7/2006 |
| WO | WO 2008/054880 | 5/2008 |
| WO | WO 2008/062024 | 5/2008 |
| WO | WO 2008/087171 | 7/2008 |
| WO | WO 2009/137228 | 11/2009 |
| WO | WO 2009/153443 | 12/2009 |

OTHER PUBLICATIONS

Bedrosian, P.A. et al. (2007), "Lithology-derived structure classification from the joint interpretation of magnetotelluric and seismic models," *Geophys. J. Int.* 170, 737-748.

Buland, A. et al. (2008), "Bayesian lithology and fluid prediction from seismic prestack data," *Geophysics* 73(3), pp. C13-C21.

Burstedde, C. et al. (2009), "Algorithmic strategies for full waveform inversion: 1D experiments," *Geophysics* 74(6), pp. WCC37-WCC46.

Bussieck, M.R. et al. (2003), "Mixed-integer nonlinear programming," *SIAG/OPT Newsletter* 14(1), pp. 19-22.

Guillen, A. et al. (2004), "Constrained gravity 3D litho-inversion applied to Broken Hill," *ASEG 17$^{th}$ Geophysical Conf. & Exh.*, 6 pgs.

Xu, S. et al. (1995), "A new velocity model for clay-sand mixtures," *Geophysical Processing* 43, pp. 91-118.

Xu, S. et al. (2009), "Modeling elastic properties in carbonate rocks," *The Leading Edge* 28, pp. 66-74.

*International Search Report and Written Opinion*, dated Oct. 7, 2011, PCT/US2011/40929.

Bornard, R., et al. (2005) "Petrophysical Seismic Inversion to Determine More Accurate and Precise Reservoir Properties", *SPE 94144*, SPE Europe/EAGE Annual Conference, held in Madrid, Spain, Jun. 13-16, 2005. pp. 1-13.

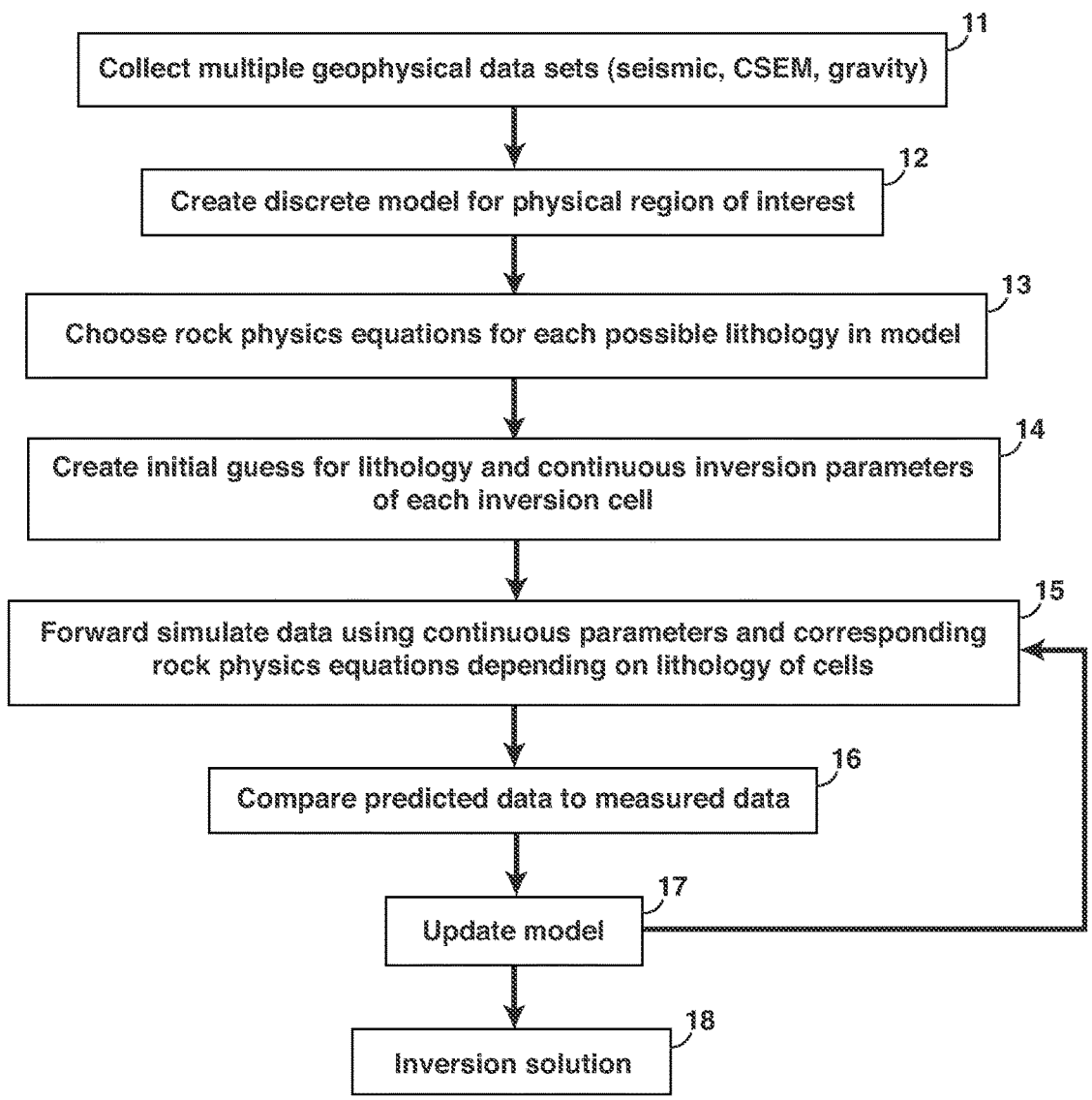

INVERTING GEOPHYSICAL DATA FOR GEOLOGICAL PARAMETERS OR LITHOLOGY

CROSS-REFERENCE TO RELATED APPLICATION

This application is the National Stage of International Application No. PCT/US2011/040929, that published as WO 2012/015542, filed 17 Jun. 2011, which claims the benefit of U. S. Provisional Application No. 61/368,035, filed 27 Jul. 2010, each of which is incorporated herein by reference, in its entirety, for all purposes.

FIELD OF THE INVENTION

The invention relates generally to the field of geophysical prospecting. More particularly, the invention pertains to using remote geophysical data to infer geological properties of the subsurface.

BACKGROUND

Remote geophysical data are likely to include active seismic reflection data; electromagnetic data (either controlled source or magneto-telluric); and/or gravity measurements; however, they may include any type of data that can be used to remotely infer the properties of subsurface rocks in the region of interest. These rock properties can be converted to the geological properties of interest in hydrocarbon exploration (e.g., porosity and fluid type) via some sort of rock physics relationship, which can be embedded in the mathematical equations used to invert the geophysical data. In general, to perform inversions of this type, one must assume a particular rock physics relationship between the geophysical parameters that predict the data and the geological parameters of interest. This assumption generally restricts one to an a priori assumption of the lithology (or class of rocks), that is present in the subsurface. A lithology class is a rock type that is considered to possess unifying rock physics behavior for the purposes of the inversion; e.g. clastics and carbonates might be considered two distinct lithology classes in a particular model each with their own rock physics relationship. However, the lithology in the subsurface of a particular region of interest is often not known beforehand, and, in addition, a single physical volume covered by the data may contain more than one lithology with an unknown distribution of the lithologies.

Current methods for inverting geophysical data for geological parameters and/or lithology generally fall into one of two categories. The first category covers methods where the lithology class is assumed known and an appropriate rock physics model is applied. In this case, if a "lithology" is to be found during the inversion it refers not to a discrete lithologic class as the term is used in this document, but to a lithology parameter that changes the physical nature of the rock in a predictable and continuous manner. For example, the lithology is assumed to be clastic, and part of the inversion involves estimating the percentage of clay in the rock (Vclay). This method is exemplified by Saltzer et al (2008) in which an inversion of seismic data for elastic parameters in the subsurface is performed and then a second inversion for the continuous geologic parameters—porosity and Vclay—is performed.

Statistical methods, the second category of methods for inverting for geological parameters, blur the distinction between lithology classes as a discrete categorical label and lithology. This is possible because a lithology in this method is simply defined as a class of rocks that can be assigned a probability density function (pdf) of continuous parameters (e.g. seismic p-wave velocity, or porosity): no explicit rock physics equations are necessary. The use of the statistical method is demonstrated by Guillen et al (2004) who use gravity and magnetic data to invert for lithology of the subsurface. At each iteration of the inversion, the density and magnetic susceptibility of a resolution cell is chosen randomly from the pdf of the lithology that is currently assigned to that cell. In this case, the lithology class of the rocks is not taken as known before the inversion; instead, the lithology, along with density and magnetization, of the inversion cells can change as the inversion progresses (in this particular example, via use of a Metropolis type Monte Carlo pseudo-random process). A similar example is the inversion of active seismic reflection data for lithology using a Bayesian framework, where again the various lithologies are assigned pdfs, in this case for the elastic parameters (Buland et al. 2008).

The approach of Ruckgaber (1990) is slightly different from the statistical methods described above in that it uses a deterministic selection of lithology after inverting for geophysical properties. This is achieved by dividing the space of inverted geophysical properties into various lithologies with hard boundaries. At every point in the subsurface model the inverted geophysical properties are plotted in this space and the region in which they land determines the lithology for that point.

SUMMARY

In one embodiment, the invention is a method for estimating at least lithology of a subsurface region, comprising: obtaining at least one type of remote geophysical survey data representing the subsurface region; developing a model of the subsurface region in terms of at least lithology, wherein the model subdivides the subsurface region into discrete cells in which lithology is represented as a discrete valued model parameter; and using a computer to invert the at least one type of remote geophysical survey data to obtain at least lithology of the subsurface region.

In a more specific embodiment, the invention is a method for estimating geological parameters in the subsurface using one or more remote-sensing data types when the lithology class or facies of the rocks is unknown comprising:
a) selecting a set of possible lithology classes and associated rock physics equations;
b) creating a discretized model of the subsurface;
c) associating each point in said discretized model with geological parameters, said parameters having continuous values;
d) further associating each point in said discretized model with a discrete categorical variable each value of which corresponds to one of a set of predetermined lithologic classes;
e) associating each possible lithologic class with a particular set of rock physics equations, said equations relating the geological parameters to be solved in the inversion to geophysical parameters that can be used to calculate predicted data;
f) utilizing the appropriate rock physics equations in every cell in space at every stage of the inversion depending on the current value of the said discrete categorical variable in each cell; and g) solving an inversion problem to determine the value of said continuous geological parameters and said discrete categorical variable.

BRIEF DESCRIPTION OF THE DRAWINGS

The present invention and its advantages will be better understood by referring to the following detailed description and the attached drawings in which:

FIG. 1 is a flow chart demonstrating primary steps of one embodiment of the invention.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION

The present invention is a method for rock physics based inversions of geophysical data for subsurface properties in which the lithology class, also referred to as rock type or facies, need not be known beforehand. Instead of assigning a rock type a priori, this invention uses the lithology classes as a discrete inversion parameter to be found during the inversion. At each step in the inversion, the appropriate rock physics relationship is used on the resolution cells depending on what lithology each cell is currently assigned to. The lithology parameter is allowed to vary both as the inversion evolves and as a function of space (allowing for mixed lithologies in a single physical volume).

An inversion of geophysical data sets for geological properties, such as porosity, requires a mapping between the geophysical parameters of the rock, such as seismic velocities or electrical conductivities, to the geological parameters of interest. Such a mapping often takes the form of a set of rock physics equations. These equations are empirically or theoretically derived for a particular lithology or rock type. The rock physics relationship can also include inversion constraints. However, any one rock physics relationship is applicable only to a certain subset of rocks or lithology class.

In this context, "lithology" of the rocks is defined as a class of rocks unified by a single set of rock physics relationships at a given scale. When interested in detailed, fine scale variations, one may classify lithologies narrowly (e.g. turbidite clastics, slope clastic facies, etc.), however, at larger scales of interest one may classify lithologies more broadly (e.g. clastics, carbonates, salt, etc.). All that is required of a lithology is that it is adequately described by a set of relationships relevant to the inversion. Of course, the choice of possible lithologies will depend on the resolution desired, the types of data available, and the geological questions to be investigated by the inversion.

As used herein, "geophysical" parameters are those that can be used to calculate (forward model) geophysical data, e.g. seismic velocity, density, conductivity/resistivity, elastic coefficients, etc. "Geologic" parameters are those that more directly describe the rock, e.g. Vshale (percentage of shale in a clastic rock), porosity, water saturation, etc.

The present inventive method begins with collecting or otherwise obtaining one or more geophysical data types over a region of interest. These remotely acquired data types can include, but are not limited to: seismic reflection, seismic refraction, controlled source electromagnetic (CSEM), magnetotelluric (MT) and gravity. A model of the subsurface region of interest is created in which space is divided into several regions or resolution cells (discretization). Each cell is associated with zero or more inversion parameters with continuous values. (A case where the number of continuous inversion parameters can be zero is described later in the invention description.) As the term is used herein, the continuous inversion parameters are normally the geological parameters. In these cases, the geophysical parameters are simply intermediate products needed to perform a forward calculation in order to find a data misfit. However, in at least one embodiment of the invention discussed below, the geophysical parameters are the continuous inversion parameters and the lithology determines inversion constraints rather than equations to convert geological parameters to geophysical parameters. In each of the above described embodiments, each cell is further associated with a discrete categorical variable, each value of which corresponds to one of a set of predetermined lithologic classes. (Thus, each embodiment of the invention has at least one inversion parameter, that being the discrete lithology parameter, and may have one or more additional inversion parameters which can be geologic parameters or geophysical parameters.) Each lithologic class is defined by having a set of deterministic equations (the "rock physics" equations) and/or constraints to be applied to the inversion objective function.

An initial model for the inversion is created by assigning an initial guess value to each of the inversion parameters—both any continuous geological parameters and the discrete lithology parameter—at every resolution cell. The appropriate rock physics relationship for the assigned lithology is then applied to each cell to calculate the geophysical parameters needed to forward simulate the collected data, for example resistivity in the case of electromagnetic data. This calculation will involve the continuous inversion parameters, if there are any. The inversion objective function is essentially a misfit function defined as some form of energy norm of the misfit between the observed and predicted data. The predicted data are obtained using a forward simulator, which takes as input the properties of the inversion cells. The objective function can also contain any constraints applied in accordance with the value of the discrete lithology parameter. The inversion then proceeds to find the best fitting discrete lithology and continuous geological parameters by minimizing this objective function. See FIG. 1.

In frontier hydrocarbon exploration the broad lithology classes of the rocks are often not known; in this case, possible lithologies for the inversion may be drawn from clastic, carbonate, salt, and basalt based on prior geological knowledge of the area. The data sets collected must be able to distinguish among the chosen lithologies. Table 1 outlines possible lithologies for a possible embodiment of the invention and how they fill different regions of the geophysical property space for the proposed data types used in a preferred embodiment of the invention. Table 1 demonstrates how a combination of different data types can allow distinguishing among several possible lithologies; therefore, the data set might include collecting active seismic refection, controlled source electromagnetic, and gravity data over a region of interest. In this example, a combination of, for example, velocity, conductivity, and density uniquely identify the lithology of the rock (i.e. if one knows all of those parameters, one could distinguish the lithologies in Table 1). Therefore, one would want to collect data types that are sensitive to these properties. This should allow for the unique identification of the lithologies using the present inventive method. In other words, different data are primarily sensitive to different geophysical properties which can be used to constrain the lithology. The inversion may of course also solve for the geological parameters along with the lithology, so the discussion of Table 1 is meant to illustrate how using multiple data types together allow one to find the lithology.

TABLE 1

| Lithology | Density | Resistivity | Velocity |
|---|---|---|---|
| Basalt | High | High (unless heavily fractured) | High |
| Salt | Low | Low (unless massive without fractures) | High |
| Clastics | Intermediate | Low (unless hydrocarbon filled) | Low |
| Carbonate | Intermediate | High (depending on dolomitization) | High |

During the inversion, the aim is to minimize the difference between the measured data and the data predicted by the inversion model. In order to perform a predicted data calculation, geophysical parameters such as seismic velocity (or, equivalently, elastic coefficients), and electrical conductivity or its equivalent, resistivity, must be known. The rock physics models are used to calculate the needed geophysical parameters such as elastic coefficients, electrical conductivities, and density that are necessary for forward calculating (alternatively called simulating or forward modeling) the predicted data. The particular set of rock physics equations to be applied at any given point in the model and at any given step in the inversion process is determined by the current value of the discrete lithologic parameter for that point. Rock physics equations that may be applied to the clastic lithology include that described by Xu and White (1995).

Table 1 shows that to completely describe the geophysical parameters necessary to calculate synthetic data may require determining extra parameters applicable to certain lithology classes. For example, in order to constrain the seismic velocity, electrical conductivity, and density of a clastic rock it may be necessary to know the percentage of clay mineral in the rock (Vclay); therefore Vclay will need to become an additional inversion parameter. Other potential parameters include the amount of dolimitization a carbonate rock has undergone or the fracture density of basalt.

This sort of optimization approach involving both continuous and discrete inversion parameters falls under a class of algorithms that provide a solution scheme for mixed integer non-linear programs ("MINLP") (See Bussieck and Pruessner, 2003). Mixed-integer non-linear programs are optimization problems, in which the objective function and/or constraints are nonlinearly dependent on a mix of continuous and discrete parameters.

With reference to FIG. 1, the method of one embodiment of the present invention for performing the inversion for geological parameters when the lithology of the subsurface rocks is not known a priori may be described as follows:

At step 11, collect geophysical data (e.g., CSEM, MT, seismic, and/or gravity data).

At step 12, discretize the subsurface into inversion resolution cells at the desired scale length of interest.

At step 13, pick a finite set of lithologic classes (e.g. basalt, salt, clastic, and carbonate). For each class, choose from the literature or otherwise develop a corresponding set of equations that relate the rock parameters (e.g., velocity, density, conductivity) to the geological parameters (e.g., porosity, lithology, fluid type). For carbonate rocks, see Xu and Payne (2009). Basalt and salt are often assumed to have fixed values for the geophysical parameters. Persons who work in the technical field will know of other sources for these and other lithologies.

At step 14, create an initial guess for all geological inversion parameters (both continuous geological properties and discrete lithologies).

At step 15, using the initial guess of the inversion parameters and the rock physics relationships, forward predict (i.e., simulate) the geophysical data, and at step 16, compute the misfit between the predicted and measured data.

At step 17, iteratively update the model, using for example a mixed integer non-linear programming (MINLP) scheme. Alternatively, there are other methods that can be used to solve the problem, for example disjunctive programming. In determining the update, damping terms and lithologic/rock physics constraints may be included in the objective function. This function is to be minimized in the inversion, resulting in optimized estimates of the geological parameters and lithologies of the subsurface resolution cells. The constraints are non-deterministic parts of the rock physics model that help to restrict solutions to geologically realistic combinations of parameters. For example, in a cell with a clastic lithology, it may be reasonable to expect porosity and Vclay to be inversely correlated, so a term could be added to the objective function that penalizes solutions that do not follow this trend.

When the objective function's value is reduced to within a pre-set tolerance, a possible solution (18) to the inverse problem has been found; that is, the last updated model may be the desired optimized solution, and will be unless the optimization process has converged on a local minimum.

In practical applications of the invention, at least steps 15 through 17 will be performed on a computer.

There may be circumstances in which the values of any continuous inversion parameters are not of interest and only the discrete lithology is to be found. In this case, the rock physics relationships associated with the possible lithology classes must be such that each one uniquely identifies the geophysical parameters to which the remote sensing data collected are sensitive. For example, one might specify turbidite sands as a lithology class and assign a rock physics model that defines all turbidite sands to have a single seismic velocity. This type of mapping is likely possible only if one has detailed knowledge of the region of interest and is able to define the geophysical parameters of the rocks fairly precisely; this embodiment, therefore, would be of use when there is tight well control on the behavior of the rocks in the volume of interest, and the invention is being used on a small volume where such relationships are reliable. When the invention is applied to this case, the discrete lithology parameter is the inversion parameter. This embodiment may comprise steps such as:

a) selecting a set of possible lithology classes and associated values of geophysical parameters that can be used to predict the measured data types;
b) creating a discretized model of the subsurface;
c) associating each point in said discretized model with a discrete categorical variable each value of which corresponds to one of a set of predetermined lithologic classes;
d) associating each possible lithologic class with a particular set of geophysical parameters that can be used to calculate predicted data;

e) utilizing the appropriate rock physics equations in every cell in space at every stage of the inversion depending on the current value of the said discrete categorical variable; and f) solving an inversion problem to determine the value of the discrete categorical variable, which indicates the lithology at each cell.

Related to this embodiment is an additional embodiment in which only a single data type is used in the inversion. Table 1 shows that using a single data type is often not possible when the lithologies used are broad classes and/or many continuous parameters are also sought. However, in cases where more a priori information is known about the region of interest and/or the region is quite small as described above, it may be possible to use only a single data type (e.g. seismic reflection data) to constrain the unknown properties of the subsurface.

It is also possible to perform an inversion over the unknown discrete lithologic class and the geophysical properties directly related to the measured data (e.g. p-wave velocity for seismic data). The inversion is performed as described in FIG. 1, but the rock properties are not converted to geological properties via a rock physics relationship. The lithologic class of the rocks remains a discrete inversion parameter to be found and impacts the inversion via constraints applied to the solution model space. For example, clastic rocks and carbonate rocks may be assumed to have different relationships between p-wave and s-wave velocity. These relationships may be enforced, as the value of the discrete lithology parameter at each location in the model dictates, as additional constraints added to the inversion objective function. This embodiment of the invention may comprise steps such as:

a) selecting a set of possible lithology classes;

b) creating a discretized model of the subsurface;

c) associating each point in said discretized model with geophysical parameters, the parameters having continuous values;

d) further associating each point in said discretized model with a discrete categorical variable each value of which corresponds to one of a set of predetermined lithologic classes;

e) associating each possible lithologic class with a particular set of rock physics constraints, the constraints attempting to move the inversion solution for the continuous parameter into a particular subspace of solutions;

f) utilizing the appropriate rock physics constraints in every cell in space at every stage of the inversion depending on the current value of the discrete categorical variable in each cell; and g) solving an inversion problem to determine the value of the continuous parameters and the discrete categorical variable.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. It will be clear to those who work in the relevant technical fields that for all practical applications, some or all of the steps of the inventive method must be performed on a computer.

REFERENCES

Buland, A., Kolbjornsen, O., Hauge, R., Skjaeveland, O., and Duffaut, K., "Bayesian lithology and fluid prediction from seismic prestack data," *Geophysics* 73 (3), C13-C21 (2008).

Bussieck, M. R. and Pruessner, A., "Mixed-integer nonlinear programming," *SIAG/OPT Newsletter* 14 (1), 19-22 (2003).

Guillen, A., Courrioux, G., Calcagno, P., Lane, R., Lees, T., McInerney, P., "Constrained gravity 3D litho-inversion applied to Broken Hill," *ASEG 17th Geophsisical Conference and Exhibition*, Sydney (2004).

Ruckgaber, G. M., Method for inversion of seismic data to yield estimates of formation lithology, U.S. Pat. No. 4,964,096.

Saltzer, R. L., Finn, C. J., Xu, S., and Farrell, M. E., "Method for Predicting Lithology and Porosity from Seismic Reflection Data," U.S. Patent Application Publication 2008/0015782 A1.

Xu, S. and White, R. E., "A new velocity model for clay-sand mixtures," *Geophysical Processing* 43, 91-118 (1995).

Xu, S. and Payne, M. A., "Modeling elastic properties in carbonate rocks," *The Leading Edge* 28, 66-74 (2009).

What is claimed is:

1. A remote, deterministic method for estimating at least lithology of a subsurface region, comprising:

obtaining at least one type of remote geophysical survey data representing the sub surface region;

identifying a plurality of possible lithology classes, each class being associated with a value of the discrete valued model parameter, and each class being defined by one or more deterministic rock physics equations;

developing a model of the subsurface region in terms of at least lithology, porosity, and water saturation, wherein the model subdivides the subsurface region into discrete cells in which the lithology is represented as a value of the discrete valued model parameter;

using a computer to perform an inversion that inverts the at least one type of remote geophysical survey data to obtain at least the lithology, the porosity, and the water saturation of the subsurface region with the one or more deterministic rock physics equations that provide a mapping between the at least one type of remote geophysical survey data and the lithology, the porosity, and the water saturation of the subsurface region, wherein the inversion finds a best-fitting value of the lithology, the porosity, and the water saturation for each cell in the model by minimizing a misfit between the at least one type of remote geophysical survey data and simulated data generated by the computer from the model of the subsurface region; and drilling a well into the subsurface region based at least partly on the lithology, the porosity and the water saturation determined from the inversion.

2. The method of claim 1, wherein the one or more deterministic rock physics equations corresponding to each identified lithology class relate the porosity and the water saturation to one or more geophysical parameters required to calculate predicted geophysical data corresponding to the at least one type of remote geophysical survey data.

3. The method of claim 2, further comprising selecting one or more rock physics constraints corresponding to each identified lithology class, and applying the constraints during the inverting the at least one type of remote geophysical survey data to obtain lithology and the porosity and the water saturation.

4. The method of claim 2, wherein the one or more geophysical parameters required to calculate predicted geophysical data include at least one of a group consisting of elastic coefficients, electrical conductivity, velocity, and density.

5. The method of claim 1, further comprising associating each possible lithologic class with a particular value of a geophysical parameter that can be used to calculate predicted geophysical data corresponding to the at least one type of remote geophysical survey data; wherein the inversion iteratively compares such predicted geophysical data to the remote geophysical survey data to optimize a determination of values of the discrete valued model parameter at different cells in the model, thereby resulting in obtaining lithology of the subsurface region.

6. The method of claim 5, further comprising associating each possible lithologic class with a selected one or more rock physics constraints, and using the constraints when inverting the at least one type of remote geophysical survey data to obtain the lithology of the subsurface region.

7. The method of claim 1, further comprising associating a possible lithologic class with a selected rock physics constraint, and using the constraint when inverting the at least one type of remote geophysical survey data to obtain lithology and the at least one geological parameter of the subsurface region.

8. The method of claim 7, wherein each possible lithologic class is associated with at least one selected rock physics constraint, and which rock physics constraint or constraints to use at a given cell during the inverting depends on a current value of the discrete valued model parameter at that cell, and the rock physics constraints constrain the inverting for lithology and the at least one geological parameter to a subspace of solutions.

9. The method of claim 8, wherein the rock physics constraints are implemented in the inverting as additive terms to an objective function to be minimized.

10. The method of claim 1, wherein the plurality of possible lithology classes includes one or more of a group consisting of clastic, carbonate, salt and basalt.

11. The method of claim 1, wherein the at least one type of remote geophysical survey data includes one or more of controlled source electromagnetic, magnetotelluric, seismic reflection, seismic refraction, or gravity.

12. The method of claim 1, wherein said inverting the at least one type of remote geophysical survey data to obtain the lithology, the porosity, and the water saturation of the subsurface region follows a technique for solving mixed integer non-linear programs.

13. The method of claim 1, further comprising inverting for additional geological parameters including at least one of fracture density, degree of anisotropy, dolomitization amount, or volume of shale or clay.

14. The method of claim 1, further comprising:
performing at least one type of remote geophysical survey over a subsurface region; and
producing hydrocarbons from the well.

* * * * *